United States Patent [19]

Nikander

[11] Patent Number: 5,292,355
[45] Date of Patent: Mar. 8, 1994

[54] METHOD AND APPARATUS FOR BENDING A GLASS SHEET

[76] Inventor: Risto K. Nikander, Kemiankatu 10, SF-33720 Tampere, Finland

[21] Appl. No.: 956,481
[22] PCT Filed: Jun. 12, 1991
[86] PCT No.: PCT/FI91/00187
  § 371 Date: Dec. 31, 1992
  § 102(e) Date: Dec. 31, 1992
[87] PCT Pub. No.: WO92/00921
  PCT Pub. Date: Jan. 23, 1992

[30] Foreign Application Priority Data

Jul. 5, 1990 [FI] Finland ................... 903397

[51] Int. Cl.$^5$ ........................... C03B 23/025
[52] U.S. Cl. ........................ 65/107; 65/25.4; 65/104; 65/182.2; 65/268; 65/273
[58] Field of Search .............. 65/104, 107, 268, 273, 65/285, 106, 25.4, 182.2

[56] References Cited

U.S. PATENT DOCUMENTS

| | | | |
|---|---|---|---|
| 3,431,095 | 3/1969 | Ross | 65/107 |
| 3,526,489 | 9/1970 | McPhail | 65/25.4 |
| 4,119,424 | 10/1978 | Comperatore | 65/107 |
| 4,300,935 | 11/1981 | Seymour | 65/107 |
| 4,356,018 | 10/1982 | McMaster | |
| 4,755,204 | 7/1988 | Boardman et al. | |
| 4,986,842 | 1/1991 | Peltonen | 65/107 |

FOREIGN PATENT DOCUMENTS 81329 8/1987 Finland.

Primary Examiner—Joye L. Woodard
Attorney, Agent, or Firm—Burns, Doane, Swecker & Mathis

[57] ABSTRACT

The invention relates to a method and apparatus for bending a glass sheet. A glass sheet heated close to its softening temperature is supported on a ring mould and the glass sheet is allowed to bend by gravity. If necessary, the bending can be assisted mechanically. Air is circulated from a furnace section (1.1) above a glass sheet (7) to be bent into a furnace section (1.2) below the glass sheet so as to produce a different pressure effect on the opposite sides of a glass sheet (7). This pressure effect is used to support the glass sheet which is also heated over its central area to a sufficient temperature for bending and/or tempering, said temperature being sufficiently high that, without said support provided by the pressure effect, the central glass sheet area would bend and sag excessively downwards. The generation of pressure effect can be intensified by fitting the furnace with a ceiling (3) which includes an opening (3.1) for positioning said ring mould (6) together with its glass sheet (7) in alignment therewith.

13 Claims, 4 Drawing Sheets

METHOD AND APPARATUS FOR BENDING A GLASS SHEET

BACKGROUND AND SUMMARY OF THE INVENTION

The present invention relates to a method for bending a glass sheet, said method comprising the following steps:
- a glass sheet is heated in a bending furnace close to its softening temperature,
- a heated glass sheet is supported on a ring mould, and
- a glass sheet is allowed to bend by gravity.

The invention relates also to an apparatus for bending a glass sheet, said apparatus including:
- a bending furnace fitted with heating devices for maintaining the furnace temperature sufficiently high for bending a glass sheet and
- a ring mould for carrying a glass sheet to be bent in the bending furnace.

The invention can be applied in association with various types of furnace plants. In one main type, a glass sheet supported on a ring mould is carried from on furnace section into another by increasing temperature in successive furnace sections. In the final section, a sufficiently high temperature is reached for bending. In another main type, a glass sheet is heated in a furnace fitted with rollers and is then lifted from the rollers e.g. by means of an overhead vacuum pick-up and lowered on top of a ring mould brought thereunder, whereafter the bending can be effected upon the ring mould in the furnace or in a separate bending section downstream of the furnace.

Regardless of a type furnace employed, a problem with bending effected on ring moulds has been the control of temperature and bending in various sections of a glass sheet. If the overall temperature of a glass sheet is increased to a sufficient level in order to effect the bending of difficult-to-bend margianl sections, the central section of a glass sheet is also softened to the extent that it bends and sags too far downwards.

It is prior known to overcome this problem by applying a more powerful heating effect to the marginal sections of a glass sheet for the sufficient bending thereof, but the central area of a glass sheet is left to be substantially colder (e.g. 580° C.) for avoiding its excessive bending and sagging downwards. However, a resulting drawback in this method is that it is not possible to produce properly tempered glass since for a proper tempering effect the entire area of a glass sheet should be heated to over 600° C., preferably to the temperature of appr. 610°–620° C.

An object of the invention is to provide a method and apparatus for bending a glass sheet on a ring mould substantially gravitationally while simultaneously heating the entire area of a glass sheet to a sufficient temperature for bending and, if necessary, also for tempering.

A particular object of the invention is to provide a method and apparatus for controlling and regulating the gravitational bending of the entire area of a glass sheet in a manner independent of the normal interrelation between gravity and temperature. An additional feature of the invention is a possibility of focusing the heating effect on the areas critical in terms of bending.

These and other objects of the invention to be described in more detail hereinafter can be achieved on the basis of the characterizing features set forth in the annexed claims.

BRIEF DESCRIPTION OF THE DRAWING FIGURES

A few embodiments of the invention will be described in more detail with reference made to the accompanying drawings, in which FIG. 1 is a schematic and axonometric and partially cutout view of an apparatus for carrying out a method of the invention.

FIG. 2 shows a bent glass sheet.

FIGS. 3A–C illustrate schematically in a side view the bending of a glass sheet by means of a method and apparatus of the invention at various stages of bending.

DESCRIPTION OF PREFERRED EMBODIMENTS

Figure 1:
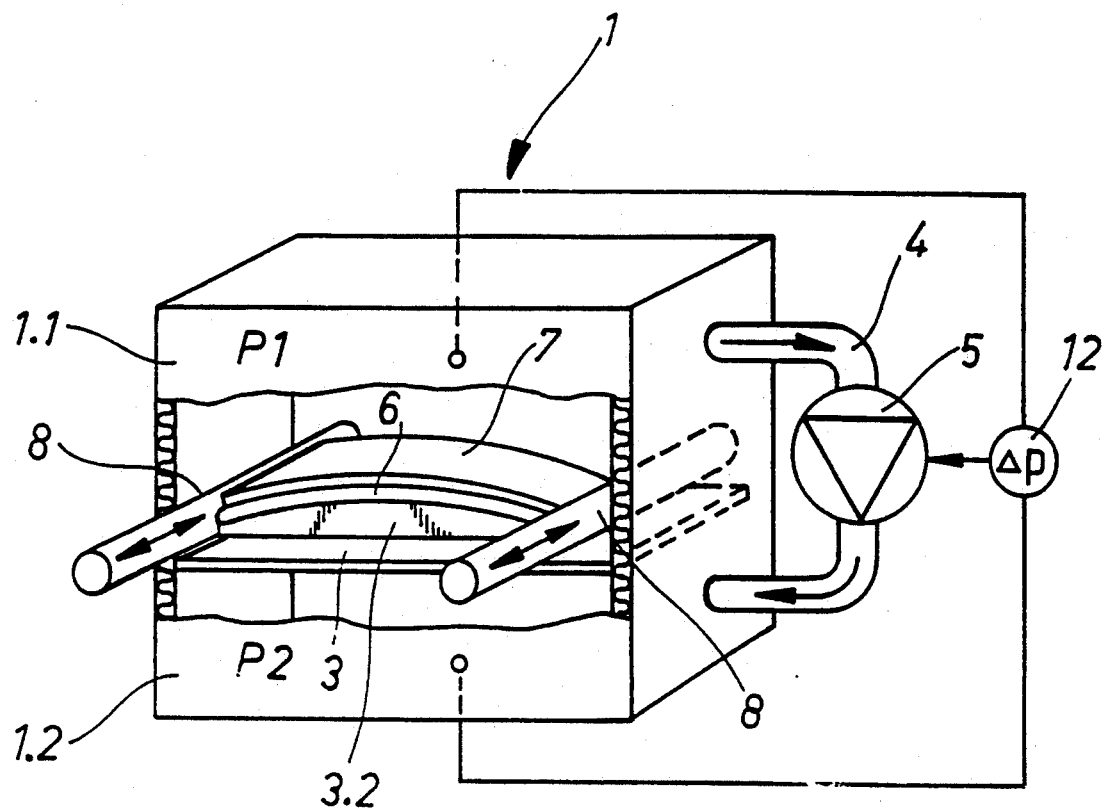
Figure 2:
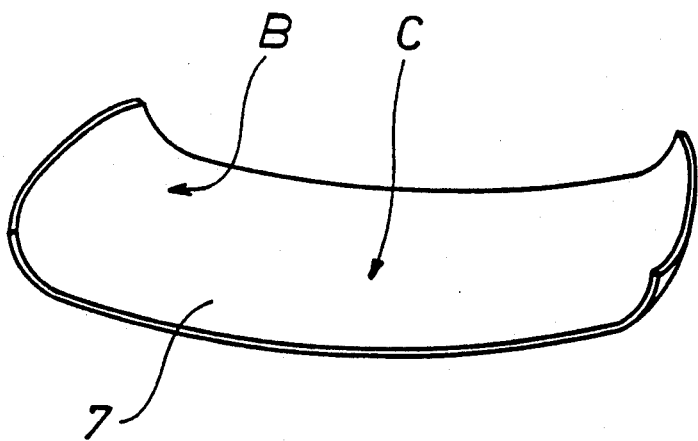
Figure 5:
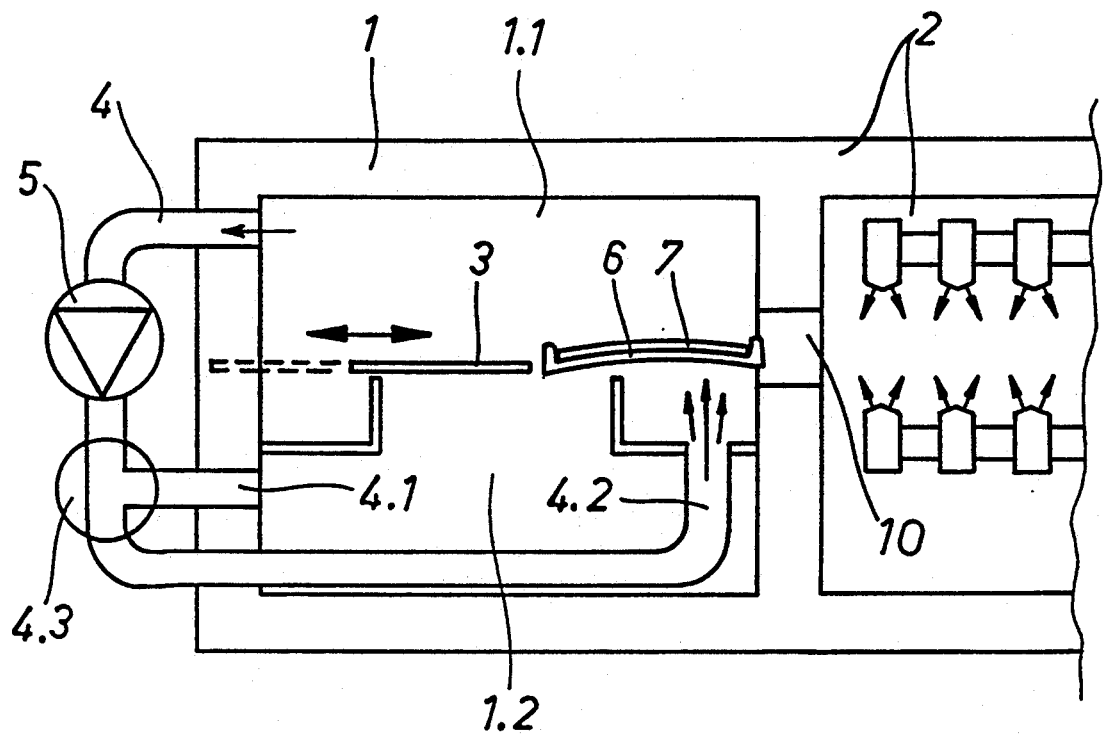
FIG. 5 shows a schematic vertical section of an apparatus for carrying a bent glass sheet into a tempering section after heating said glass sheet to a tempering temperature.
Figure 6:
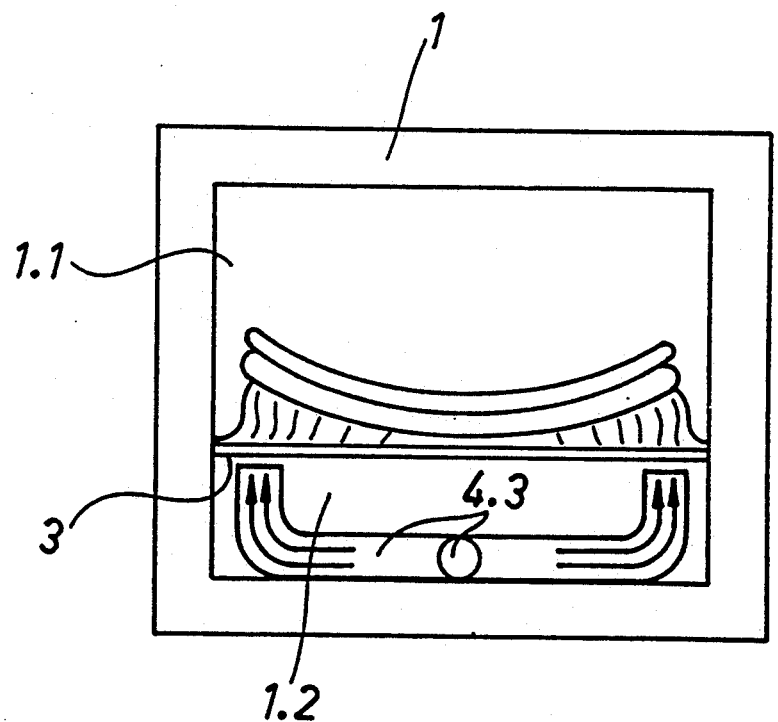
FIG. 6 shows a schematic vertical section of a bending furnace, wherein an intensified heating effect is focused on the marginal sections of a glass sheet by using the same blast air that is used to create a glass-sheet supporting pressure difference.

Referring particularly to FIGS. 1, 5 and 6, a furnace 1 is divided with a ceiling 3 into a top furnace section 1.1 and a bottom furnace section 1.2. Between furnace sections or chambers 1.1 and 1.2 extends a conduit or manifold 4, fitted with a fan 5 for carrying air from top furnace section 1.1 to bottom section 1.2. The ceiling 3 is provided with an opening 3.1 (see also FIGS. 3A, 7 and 8), a ring mould 6 and a glass sheet 7 supported thereby being positioned above and in alignment with said opening. The rim of opening 3.1 can be more or less sealed against ring mould 6 by means of a collar-shaped gasket 3.2. Partition 3 and collar 3.2 can be made of sheet metal. When ring mould 6 together with its glass sheet 7 has been placed above opening 3.1 and fan 5 is operated for carrying air from above to below said ceiling 3, a pressure difference is created on the opposite sides of glass sheet 7 acting to support said glass sheet 7. Pressure-difference measuring means 12 is used to control the output of fan 5 so as to produce a desired pressure difference and supporting action for glass sheet 7. By virtue of this pressure difference, the entire glass sheet 7 can be heated to a sufficient temperature of 610°–620° C. for tempering without the excessive downward sagging of a glass sheet central section C, which is not supported by the ring mould.

The end sections and areas close to the corners of a glass sheet will become critical bending areas B, where the deformation and necessary elongation of a glass sheet are the most significant. As shown in FIG. 6, the air used for creating a pressure difference can be focused by means of conduits 4.3 on these critical bending areas, the increased convection intensifying the heating of these areas. A pressure created by the blast flow can naturally be used to contribute to the fact that a pressure difference prevailing on the opposite sides of a glass sheet varies over the various portions of the surface. However, over the entire surface area of glass sheet 7 an underneath pressure $P_2$ is substantially higher than an overhead pressure effect $P_1$. In this context, the term "pressure effect" must be understood in a wide sense so as to cover also the reacting force of a flow impinging against the glass surface.

Figure 3A:
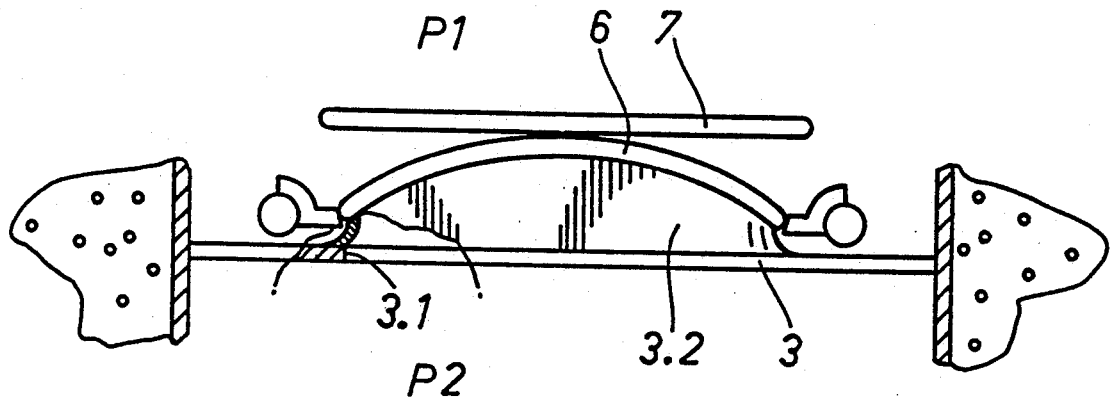
Figure 3B:
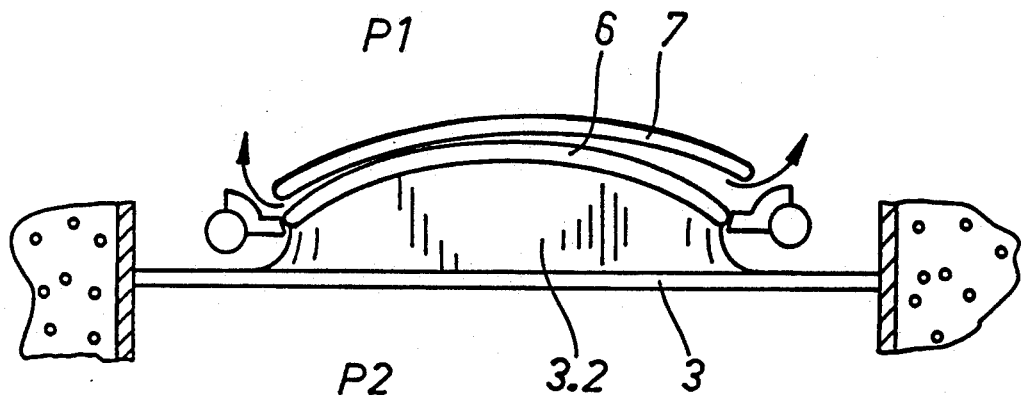
Figure 3C:
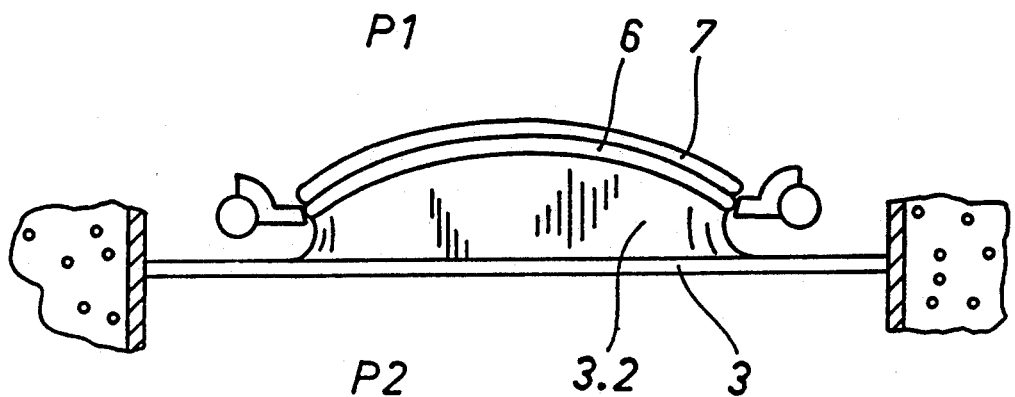

Contrary to conventional edge-mould bending, the case of FIG. 3 illustrates a mould assembly for effecting downward bending of the marginal and corner areas of a glass sheet while lifting up the central portion. Lifting up the central portion is thus effected by means of both the mould assembly and said pressure difference. FIG. 3A shows a glass sheet at the initial stage of heating. In FIG. 3B a glass sheet has already bent almost to the shape of a mould. Thus, the air flow over the marginal sections of a glass sheet from pressure $P_2$ to pressure $P_1$ has accelerated. This flow serves to heat the marginal sections of a glass sheet and contributes to the downward bending thereof. However, the flow in itself does not create in the marginal sections a pressure difference which would exceed that prevailing in the central area. In FIG. 3C, the bending action is completed and a glass sheet can be carried to tempering. The glass sheet can be carried into a tempering section 2 as shown e.g. in FIG. 5. The ceiling 3 is provided with means 3.3 for displacing the ceiling 3. In the present embodiment, said ceiling 3 is horizontally displaced by the means 3.3 and, thus, the pressure difference over glass sheet 7 can be maintained during the transfer of mould 6 from furnace 1 into tempering section 2. Alternatively, the displacing means 3.3 vertically displaces the ceiling 3. As shown in FIG. 5, during the course of transfer, a valve 4.3 is employed for directing the blast from a conduit leg 4.1 into a conduit leg 4.2 to below an entrance gate 10 in order to make sure that the glass-sheet 7 supporting pressure is maintained up to the start of a tempering blast or at least up to the time so close to a tempering blast effect that there is no time for glass sheet 7 to reshape itself through bending or sagging downwards. Of course there are also other possibilities of maintaining a pressure difference effect even during the course of transfer.

Figure 4:
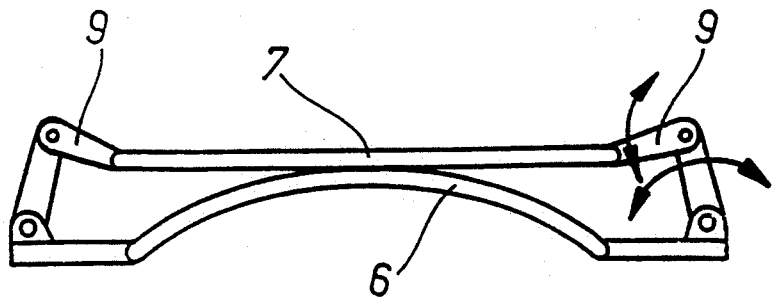
FIG. 4 is a schematic side view of a mould assembly fitted with means for facilitating the bending of a glass sheet mechanically.

FIG. 4 illustrates a mould including lever linkages 9 which provide mechanical benders for gripping on the edge of glass sheet 7, which turn the edges of a glass sheet downwards even in the case that said pressure difference should prevent downward bending of the edges in a reasonable period of time and at a reasonable tempering temperature.

Figure 7:
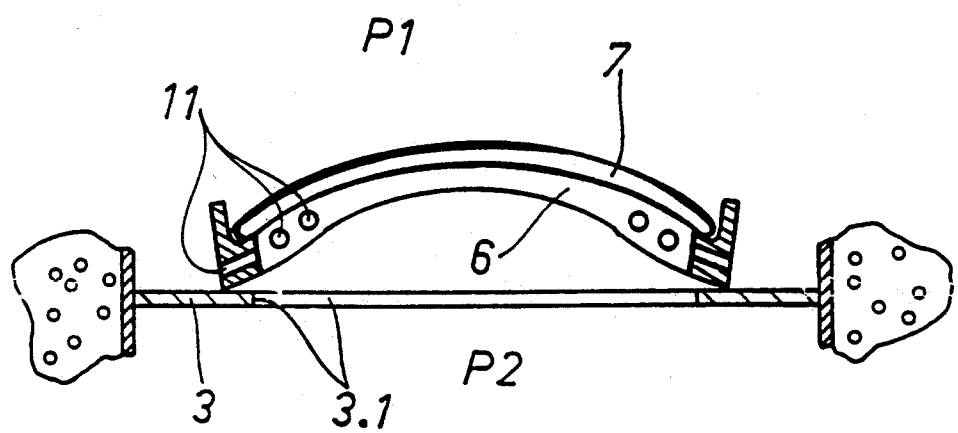
FIG. 7 shows a schematic section of yet another mould assembly, wherein holes or slots 11 in a mould are utilized for controlling an air flow created by a pressure difference prevailing on the opposite sides of a mould.

In the example shown in FIG. 7, said mould 6 is provided with holes or slots 11 for passing air from higher pressure $P_2$ to lower pressure $P_1$ therethrough. The disposition and shaping of holes or slots 11 can be used to control this air flow so as to produce a boosted convection effect on critical bending areas.

Figure 8:
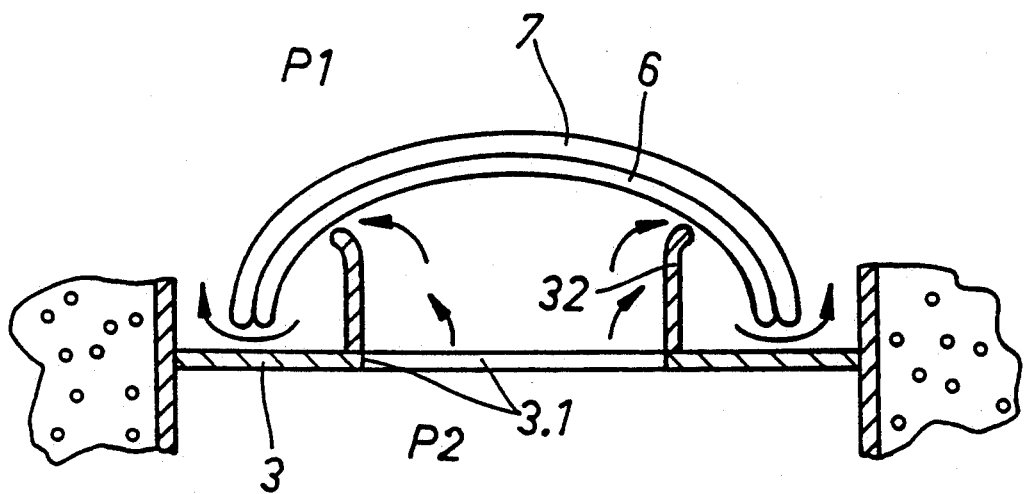
FIG. 8 shows yet another schematic cross-section of a mould assembly for confining a pressure difference prevailing on the opposite sides of a glass sheet on the central section of a glass sheet surface area.

In the case of FIG. 8, the surface area of opening 3.1 and sealing collar 3.2 is considerably smaller than that of ring mould 6, whereby the pressure-difference effect can be focused on the central area of a glass sheet while the downward-bending marginal areas are freely allowed to bend downwards without any resistance on the part of said pressure difference. Thus, the marginal areas of a glass sheet can be provided even with sharp bends.

The transfer of glass sheet 7 and mould 6 between a furnace and a tempering section can be effected e.g. by means of shifting rods 8 (FIG. 1) to which said mould 6 is attached.

Since a pressure difference between furnace sections 1.1 and 1.2 is not needed until the time that a glass sheet begins its bending, said fan 5 need not be operated at the early stage of a heating cycle provided that the heating of glass sheet 7 to its final bending temperature is not effected until in bending furnace 1. On the other hand, if a glass sheet 7 heated to a bending temperature or close to a bending temperature is brought into bending section 1 from a preceding furnace section, said fan 5 can be in continuous operation. However, towards the end of a bending procedure, especially if ceiling 3 and collar 3.2 are quite tightly sealed, the blasting power 5 must be lowered in order not to increase the pressure difference between furnace sections 1.1 and 1.2 after said glass sheet 7 has shut off the flow path.

A method of the invention offers e.g. the following benefits:

1. A glass sheet is subjected to mechanical contact within the marginal areas only and, thus, there will be no surface defects in the central portion of a glass sheet which is subject to the strictest quality requirements.

2. The bending of glass occurs gravitationally without any significant contact or force, whereby the bending lines are resilient and smooth and glass does not develop optical defects as a result of "discontinuous" bending or depressions caused by a mouldsurface contact.

3. The entire area of glass can be heat to a sufficiently high temperature for tempering so as to facilitate the bending and tempering of even thin glasses.

4. The bending mould technique is less expensive and can be put to practice more readily than ceramic moulds.

5. The monitoring of glass temperature and bending is simple with a glass sheet stationary. As a result of a pressure difference the action of gravity is partially eliminated, whereby the bending also proceeds at a slow rate and the bending process can be carried out gently without abrupt deformations.

6. The heating effect can be focused on critical bending spots.

7. Since the method facilitates bending at high temperatures, a glass sheet can be shaped also to complicated bending forms solely by means of a combined action of a rim mould and a local air blast. Up until now such complicated bending forms have always required expensive ceramic moulds.

The invention has only been described above with reference to certain exemplatory embodiments and it is obvious that the details and structural embodiments of the invention can be subjected to a plurality of modifications within the scope of the annexed claims.

I claim:

1. A method for bending a glass sheet, comprising:
 heating a glass sheet in a bending furnace close to its softening temperature; supporting the heated glass sheet on a ring mould;
 allowing the glass sheet to bend by gravity;
 circulating air from a furnace section above the glass sheet into a furnace section below said glass sheet so as to create a different pressure effect on opposite sides of the glass sheet; and supporting, by this pressure effect, the glass sheet to be bent which is heated also over its central area to a sufficient temperature for tempering, which temperature is so high that without said pressure effect the central glass sheet area would bend and sag excessively downwards.

2. A method as set forth in claim 1, wherein at least some of the air to be circulated to below the glass sheet is blown against a bottom surface of said glass sheet in a locally focused manner so as to increase the convection heat effect on selected bending spots.

3. A method as set forth in claim 1, wherein the ring mould and glass sheet are positioned in said furnace in alignment with a ceiling which includes an opening for intensifying the pressure effect on the glass sheet.

4. A method as set forth in claim 1, wherein at least one of marginal and corner areas of the glass sheet are allowed to bend downwards while a central area is lifted by said pressure effect.

5. A method as set forth in claim 1, wherein the different pressure effects prevailing on the opposite sides of the glass sheet are measured and power of an air-circulation fan (5) is adjusted on the basis of said measurement.

6. A method as set forth in claim 1, wherein the bending of marginal areas of the glass sheet is assisted by mechanical press elements.

7. A method as set forth in claim 1, wherein said different pressure effect is maintained on opposite surfaces of the glass sheet also during the course of its transfer from the furnace into a tempering section.

8. An apparatus for bending a glass sheet, comprising:

a bending furnace fitted with heating devices for maintaining a furnace temperature sufficiently high for bending a glass sheet;

a ring mould for carrying a glass sheet to be bent in the bending furnace;

a ceiling which divides the furnace into an upper and a lower section, said ceiling being provided with an opening in alignment with open central areas of the ring mould;

a conduit for connecting the upper furnace section above the ceiling to the lower furnace section below the ceiling; and a blasting assembly for carrying air through said conduit from said upper section to said lower section, for producing a different pressure effect on opposite sides of the glass sheet for supporting the bent glass sheet from below.

9. An apparatus as set forth in claim 8, wherein a rim of said opening in the ceiling is provided with means for at least partially sealing the rim against said ring mould.

10. An apparatus as set forth in claim 8, wherein said ring mould is provided with holes or slots for passing an air flow from the lower furnace section to the upper furnace section.

11. An apparatus as set forth in claim 8, wherein said opening in the ceiling confines a surface area smaller than a surface area confined by a rim of said ring mould, whereby only a portion of a bottom surface of the glass sheet is subjected to a higher pressure effect.

12. An apparatus as set forth in claim 8, wherein said ceiling is provided with means for horizontally or vertically displacing said ceiling.

13. An apparatus as set forth in claim 9, characterized in that said ceiling (3) is horizontally displaceable.

* * * * *